May 15, 1945.  W. S. DU CHARME  2,375,980
FAUCET
Filed March 1, 1943
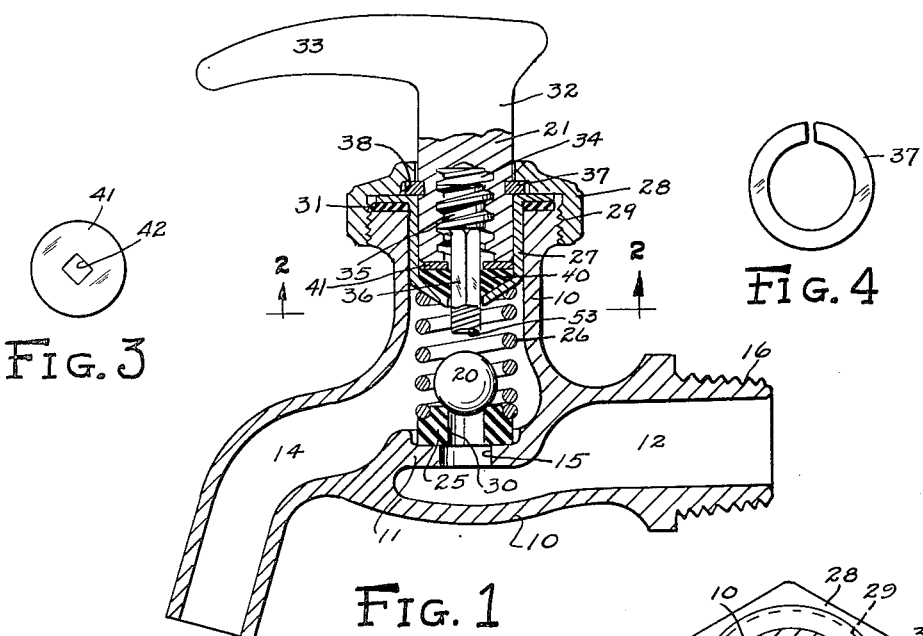
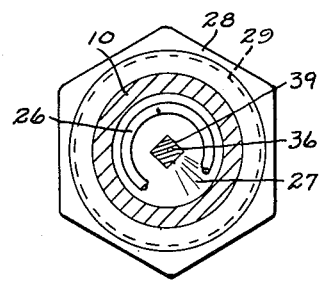
INVENTOR.
WILLIAM S. DuCHARME
BY Bates, Teare & McBean
ATTORNEYS Patented May 15, 1945

2,375,980

UNITED STATES PATENT OFFICE 2,375,980

FAUCET

William S. Du Charme, Lakewood, Ohio, assignor to Superior Valve Manufacturing Company, Cleveland, Ohio, a partnership consisting of George P. Haight, John H. Gornik, and William S. Du Charme Application March 1, 1943, Serial No. 477,557

2 Claims. (Cl. 251—2)

This invention relates to an improved faucet construction of the type generally adapted for household use. The invention is particularly concerned with the provision of an inexpensive faucet which will have the advantages now present only in the more expensive structures. These, therefore, are the general objects of the present invention.

Another object of the present invention is the provision of a faucet construction which eliminates the necessity for forming threads in or otherwise machining the interior of the faucet body. A further object of the present invention is to provide a faucet structure wherein the valve stem packing is positioned within the body of the valve and below the valve stem threads, so that the working parts of the stem are protected from contact with the fluid, thereby preventing damage to such parts, either by corrosion or by contact with the sediment.

Other objects and advantages of the present invention will become more apparent from the following description, reference being had to a preferred embodiment of the invention illustrated in the accompanying drawing, while the essential and novel features of the invention will be summarized in the claims.

In the drawing, Fig. 1 is a vertical section through a faucet illustrated by my invention; Fig. 2 is a horizontal section as indicated by the lines 2—2 of Fig. 1; Figs. 3 and 4 are detail views of certain parts of my improved faucet construction.

Referring to the drawing in detail, it will be seen that my improved faucet structure comprises a hollow body in the nature of a casting 10, provided with an internal partition wall 11 which divides the body into an inlet passage 12 and an outlet passage 14. Fluid flows from one passage to the other, through a valve port opening 15 formed in the partition wall 11. The body of the faucet 10 is provided with means, such as threads 16, for coupling the faucet to a supply line. The flow of fluid through the valve port 15 is controlled by a valve member 20. This member is actuated by an operating mechanism 21 extending through a hollow boss-like formation of the body in axial alignment with the valve port 15.

A removable valve seat member 25 preferably comprises an annular washer made of rubber, or some similar composition material, which is sufficiently soft to readily conform to any irregularities of the upper surface of the partition wall 11. The valve seat member 25 is held in position against the partition wall by a spring 26 which is interposed between the upper surface of the member and the lower surface of an inverted thimble 27 which is clamped to the upper surface of the body boss by a clamping ring or nut 28 which threadingly engages external threads formed on the boss, as indicated at 29. The arrangement is such that the spring exerts sufficient pressure on the seat member to maintain a sealing contact between it and the partition wall 11, and at the same time to prevent relative rotation between the seat member and such partition wall. This arrangement eliminates machining operations on the faucet body casting to form a valve seat, and enables replacement of the seat. As the valve seat member is made of rubber or similar composition material it is unaffected by the corrosive action of the water.

The valve member 20 comprises, as shown in Fig. 1, a sphere having an external diameter greater than the internal diameter of the opening 30 in the valve seat member, or washer 25, and less than the internal diameter of the coil spring 26. This ball or sphere may be made either of glass or of a comparatively non-compressible plastic material, to the end that it, as well as the valve seat washer 25, will be unaffected by the corrosive action of the water. The sphere 20 is of such weight that it will be forced readily upwardly within the coil spring 26 by the pressure of the water. This sphere is positively forced into contact with the valve seat washer 30 by the manual operation of the stem assembly 21 heretofore mentioned.

The valve stem assembly 21, as shown in Fig. 1, comprises a two-part stem, the upper part 32 extending upwardly through the nut 28 and being provided at its upper end with a handle 33. The upper part 32 of the stem extends downwardly into the thimble 27 and is provided with internal threads 34, which are engaged by external threads 35 formed on the upper end of a lower valve stem member 36. The upper valve stem is rotatably mounted in the thimble and is held against vertical movement by a split washer 37 seated in a groove 38 formed in the side wall of the stem 32, and which is gripped between the nut 28 and the thimble 27. The lower valve stem member 36 may be rectangular in cross section and is restrained against rotary movement by the walls of a rectangularly shaped opening 39 in the bottom wall of a thimble 27 through which its lower end projects. Accordingly, as the handle 33 is turned to rotate the stem portion 32, the non-rotating portion 36 of the stem will move toward the valve member 20 and force it into positive engagement with the valve seat 25, thus positively shutting off the flow of fluid between the inlet and outlet of the faucet. Rotation of the handle in the reverse direction, of course, moves the stem member 36 upwardly away from the ball 20, permitting the pressure of the fluid to force the ball away from its seat, thereby permitting the flow from inlet to outlet of the faucet.

An important feature of my invention is in the construction used to protect the threads 34, 35 of the valve stem assembly from the corrosive action of the fluid, and at the same time, prevent seepage of water from the interior of the faucet along the valve stem surface. To this end I interpose, between the lower surface of the upper valve stem member 32 and the bottom wall of the thimble 27, a gasket or packing material 40 which is held compressed by the clamping ring or nut 28. The lower wall of the thimble is preferably sloped as indicated in Fig. 1, so that vertical pressure on the packing results in the forcing of the packing material against the side of the lower valve stem member 36. A washer 41 having a squared opening 42 is indicated in Fig. 3, and is interposed between the lower end of the upper valve stem member 32 and the upper surface of the packing 40. Engagement of this washer with the lower stem 36 prevents relative rotation between the washer and the packing and eliminates damage to the packing which might otherwise exist.

From the above description, it will be seen that I have provided a faucet structure wherein the faucet body may be made of a simple casting in which all internal machine operations have been eliminated. While I have illustrated a faucet as being provided with external threads for attachment to a conduit, and external threads for attachment of the nut 28, it will, of course, be understood that these threads may be eliminated, if desired. The nut may be held in position by set screws, while the faucet may be attached to a supply conduit by means of a suitable gasket and split ring clamping nut, as is well known in the art. It will also be seen that I have so arranged my faucet structure that the valve stem threads are at all times protected from the action of the fluid passing through the faucet, the latter being accomplished by the positioning of the valve stem packing below said thread and within the valve body itself.

I claim:

1. In a faucet, a hollow body having inlet and outlet passages separated by a partition wall provided with a valve port, said body having an opening in communication with the outlet passage and in axial alignment with said port, a resilient valve seat washer having an opening extending therethrough positioned on said partition wall in alignment with said port, an inverted thimble extending into the opening in said body, a nut carried by said body to prevent movement of said thimble, a coil spring interposed between said thimble and said washer to retain the latter against said partition wall, a valve member comprising a sphere positioned within said coil spring, a non-rotatable valve stem extending through said thimble to move said sphere into contact with said washer to close said port consequent upon the movement of said stem, and a gasket member disposed at the bottom of said thimble to prevent fluid in said body from escaping along said stem.

2. In a faucet, a body having inlet and outlet passages separated by a partition wall provided with a valve port, said body having an opening communicating with said outlet passage and in axial alignment with said port, an inverted thimble extending into said opening and having an inverted conical surface facing said port, means to prevent relative movement between said thimble and said body, a washer seated on said partition wall in axial alignment with said port, a valve member to control the flow of fluid through said port and washer, a coil spring disposed between said thimble and washer and constructed and arranged to engage said conical surface and said washer, whereby said spring is held in axial alignment with said thimble, a threaded valve stem extending through said thimble and operable to control the position of said valve, said thimble and stem being constructed and arranged to prevent rotation of said stem, an operating member extending from the exterior of said faucet into said thimble and having threads to engage said valve stem, means to prevent relative axial movement between said member and said thimble, and means carried by said thimble and forming a fluid seal between said stem and thimble below said threads.

WILLIAM S. DU CHARME.